United States Patent
Hethcock et al.

(10) Patent No.: US 8,632,712 B2
(45) Date of Patent: Jan. 21, 2014

(54) METHOD OF SUPPORTING A STRUCTURAL BOX BEAM

(75) Inventors: James Donn Hethcock, Colleyville, TX (US); Rodney H. Jones, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 13/447,440

(22) Filed: Apr. 16, 2012

(65) Prior Publication Data
US 2012/0199269 A1 Aug. 9, 2012

Related U.S. Application Data

(62) Division of application No. 10/546,490, filed as application No. PCT/US2004/005585 on Feb. 24, 2004, now Pat. No. 8,156,711.

(60) Provisional application No. 60/450,096, filed on Feb. 24, 2003.

(51) Int. Cl.
*B29C 44/12* (2006.01)
*B29C 65/54* (2006.01)
*B29C 65/70* (2006.01)

(52) U.S. Cl.
USPC .......... 264/263; 264/46.5; 264/46.6; 264/314

(58) Field of Classification Search
None
See application file for complete search history.

(56) References Cited

U.S. PATENT DOCUMENTS

| | | | | |
|---|---|---|---|---|
| 2,567,124 A | * | 9/1951 | Roberts | 244/124 |
| 4,012,549 A | * | 3/1977 | Slysh | 428/116 |
| 5,266,137 A | | 11/1993 | Hollingsworth | |
| 5,688,426 A | | 11/1997 | Kirkwood et al. | |
| 5,827,383 A | | 10/1998 | Campbell et al. | |
| 5,829,716 A | | 11/1998 | Kirkwood et al. | |
| 5,848,765 A | | 12/1998 | Gillespie | |
| 6,092,864 A | * | 7/2000 | Wycech et al. | 296/204 |

(Continued)

FOREIGN PATENT DOCUMENTS

GB 2304744 A 3/1997

OTHER PUBLICATIONS

Examination Report from Corresponding European Application No. EP04714198.

(Continued)

*Primary Examiner* — Edmund H. Lee
(74) *Attorney, Agent, or Firm* — James E. Walton (57) ABSTRACT

An internal stiffening member of varying configurations in which the stiffening elements support the skin using a compression-only load path is disclosed. A rib can be inserted into an assembled structural box beam, and a filler material can be used to fill any gaps between the slip-in rib and the interior surface of the structural box beam. The filler material is preferably an expandable material, such as an expandable foam-type material. However, in situations where a slip-in rib forms a primary structural rib, the filler material is preferably a structural adhesive or liquid shim material. A solid adhesive or filler would not crush under the clamping forces from fasteners or bolts at localized fitting attachments.

12 Claims, 7 Drawing Sheets

(56) References Cited

U.S. PATENT DOCUMENTS

| | | | | |
|---|---|---|---|---|
| 6,165,588 | A * | 12/2000 | Wycech | 428/122 |
| 6,253,524 | B1 * | 7/2001 | Hopton et al. | 52/843 |
| 6,287,666 | B1 * | 9/2001 | Wycech | 428/122 |
| 6,305,136 | B1 * | 10/2001 | Hopton et al. | 52/309.7 |
| 6,321,793 | B1 * | 11/2001 | Czaplicki et al. | 138/93 |
| 6,341,467 | B1 * | 1/2002 | Wycech | 52/834 |
| 6,941,719 | B2 * | 9/2005 | Busseuil et al. | 52/846 |
| 7,115,324 | B1 * | 10/2006 | Stol et al. | 428/594 |
| 7,198,691 | B2 * | 4/2007 | Ludin et al. | 156/293 |
| 2002/0074083 | A1 * | 6/2002 | Ludin et al. | 156/293 |
| 2002/0195524 | A1 | 12/2002 | Amaoka | |

OTHER PUBLICATIONS

Office Action from Corresponding European Application No. EP04714198 dated Dec. 23, 2009.

Office Action from Corresponding Canadian Application No. 2,515,149 dated Apr. 7, 2010.

International Search Report and Written Opinion from corresponding PCT Application No. PCT/US04/05585, dated Jan. 11, 2005, 8 pages.

International Preliminary Examination Report from corresponding PCT Application No. PCT/US04/05585, dated Jan. 12, 2006, 5 pages.

* cited by examiner

METHOD OF SUPPORTING A STRUCTURAL BOX BEAM

CROSS REFERENCE TO RELATED APPLICATIONS

This application is a Divisional of U.S. application Ser. No. 10/546,490, having a filing date of 12 Jun. 2006, now U.S. Pat. No. 8,156,711, titled "CONTACT STIFFENERS FOR STRUCTURAL SKINS", which was the National Stage of International Application No. PCT/US2004/005585, filed on 24 Feb. 2004, which claims the benefit of U.S. Provisional Application No. 60/450,096, filed 24 Feb. 2003, now abandoned all of which are hereby incorporated by reference for all purposes as if fully set forth herein.

BACKGROUND

1. Technical Field

The present invention relates to structural skin. In particular, the present invention relates to methods and apparatuses for stiffening structural skin.

2. Description of Related Art

Structural skin is often used in manufacturing large parts, such as aircraft wing torque boxes, fuselages or control surface structures. This type of structure utilizes thin skins that would not be stable under bending and torsion loads that produce significant shear or compression in the walls. This type of construction is typical of most aerospace structures including wings, fuselages, control surfaces, tail booms, etc. Structural skins can be made thinner, and are, therefore, more weight efficient, when internal stiffening elements are used. A rib, for example, is a structural stiffening element that is disposed perpendicular to the longitudinal axis of a box beam, i.e., the rib lies in a cross-sectional plane of the beam structure. Ribs serve a variety of purposes in thin-skinned structure, including: (1) to provide support for the skin/skin stringer or spar panels against catastrophic buckling; (2) to maintain shape and contour of the skin; (3) to provide stiffness at major load introduction points; (4) to distribute concentrated loads into surrounding thinner structure; (5) to provide a shear redistribution path in the case of failure of any structural elements; and (6) to distribute pressure into the skin. These ribs are typically located at major load introduction points. In most instances, the entire rib is used to react loads; however, in some instances only certain regions of the rib is used to react loads. In addition, some ribs do not have any load introduction points, but react internal pressure loads.

Assembly of these structural box beams can be very complex, often with very tight tolerances required. As the number of parts is reduced, the manufacturing tolerances become even more critical, because there are fewer joints where variances can be accommodated. The installation of fasteners into these box beams presents additional difficulties, including limited access to small interior spaces and complicated sealing requirements.

One-piece closed cell structures can economically be produced with a variety of methods, including filament winding, automated tape placement, resin transfer molding, and others. However, these assembly-tolerance issues often preclude the use of one-piece closed-cell torque box structures with secondarily attached internal ribs, i.e., slipped-in ribs. Because of the reduction in part count and assembly labor associated with consolidating the torque box skins into a single part, a substantial cost savings could be realized if the assembly tolerance issues could be overcome. Several composite fabrication technologies are available to economically produce such a joint-free torque-box structure, including filament winding, automated tape placement, resin transfer molding, and others. Practical application of one-piece, jointless torque box structures has been limited because of the difficulty of installing the internal stiffening ribs. A rib installation design that allowed for large assembly tolerances and the resulting gaps between the rib and the torque box skins would enable more widespread application of these cost-saving technologies.

SUMMARY OF THE INVENTION

There is a need for a skin stabilization system that allows for a contact-only element in one of the two primary directions for skin stability. There is also a need for a stabilization element installation design that allows for large assembly tolerances and the resulting gaps between skin and the skin stabilization element, thereby reducing the fabrication cost of assembled structures.

Therefore, it is an object of the present invention to provide a structural stiffened skin in which the stiffening elements support the skin using a compression-only load path.

This object is achieved by providing a slip-in rib, or other stiffening member, of varying configurations in which the stiffening elements support the skin using a compression-only load path. In the preferred embodiment, the stiffening element has a peripheral edge that is adapted to be press fit into contact with the skin. The stiffening member may be held in place by various retention devices. Another configuration is a slip-in rib having a flange with a peripheral channel in which a filler material is disposed. The rib is inserted into an assembled structural box beam, and the filler material is used to fill any gaps between the slip-in rib and the interior surface of the structural box beam. The filler material is preferably an expandable material, such as an expandable foam-type material. However, in situations where a slip-in rib forms a primary structural rib, the filler material is preferably a structural adhesive or liquid shim material. A solid adhesive or filler would not crush under the clamping forces from fasteners or bolts at localized fitting attachments.

The present invention provides significant advantages, including: (1) costs associated with manufacturing closed-box structures are reduced due to relaxed tolerances and the ability to reduce part count; (2) failure of the rib/box bond is not a significant structural concern, because shear transfer through the rib/box bond is a secondary load path; (3) tolerance build-up is accommodated, because the slip-in ribs can be bonded in place as one-piece ribs; and (4) manufacturing labor is reduced, because fastener installation is reduced or eliminated.

Additional objectives, features, and advantages will be apparent in the written description that follows.

BRIEF DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, wherein:

DETAILED DESCRIPTION OF THE PREFERRED EMBODIMENT

A curved structural skin can be stabilized with circumferential stiffening elements, such as frames or ribs, or longitudinal stiffening elements, such as longerons, stringers, or caps. The present invention represents the basic discovery that the internal support mechanism for reacting buckling and retaining shape in structural skin can perform functionally through compressive load transfer only. In other words, the structural attachment of internal stiffening elements to the skin and other frame elements is redundant and unnecessary. As such, either type of stiffening element can be allowed to float relative with the skin using compression-only "contact" support, provided the stiffening element is trapped or supported by the attached or integral stiffening elements in the other primary direction.

The present invention is useful over a wide range of industries, and provides valuable benefits and advantages in any application in which it is desirable to internally support a structural skin. Although the present invention is described herein with reference to certain aircraft applications, it will be appreciated that the methods and apparatuses of the present can be used in many different applications.

Non-linear finite element analysis of box beam structures has shown that ribs with only enough structural connection to hold them in place are quite effective in supporting skins against initial buckling, and in allowing load redistribution to occur in post-buckled skins. The reason for this is that in order for the beam cross-section to deform when a panel buckles, for example, the members supporting the edges of that panel must move toward one another. This collapsing deformation is resisted by internal ribs, which prevent the edge members from moving toward one another. The ribs react collapsing deformations in compression, so no shear attachment to the skins or spars is required. The rib perimeter bond can then be considered very damage tolerant, because local discontinuities and damage do not impact the performance of the rib.

The more general case of a large aircraft fuselage skin panel stiffened using snapped-in contact sticks between frames has also been demonstrated using nonlinear finite element analysis. The slip-in sticks function adequately as stringers to prevent global buckling and fuselage collapse under shear and compression loading. In this application, the frames, which are analogous to the ribs in a torque box structure, are fixed while the stringers are not directly attached to the skins. Thus, like the slip-in rib example, this demonstrates the basic premise that stiffening elements using contact or compression-only load paths are structurally adequate for thin-skinned structures when used in one of the two orthogonal stiffening orientations.

In the aircraft applications described herein, the present invention is a means of supporting the skin/skin stringer or spar panels against catastrophic buckling, and for maintaining the shape and contour of a structural box beam, such as aircraft wing torque boxes or control surface structures. In its broadest sense, the subject invention covers two main concepts: (1) that structural stiffening elements can be installed into assembled thin-skinned structures without fasteners or shims; and (2) that the structural attachment of these stiffening elements to the skins of the structural box beam and spars is redundant and not necessary.

Figure 1:
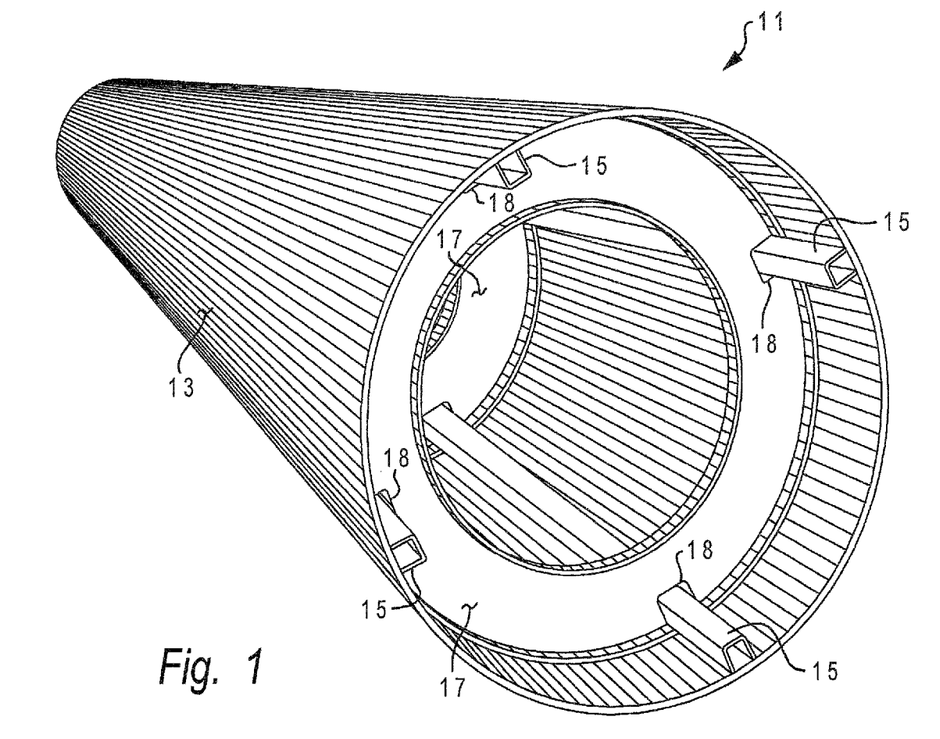
FIG. 1 is a perspective view of a conical tail boom of an aircraft having stiffening members according to the present invention.
Figure 2:
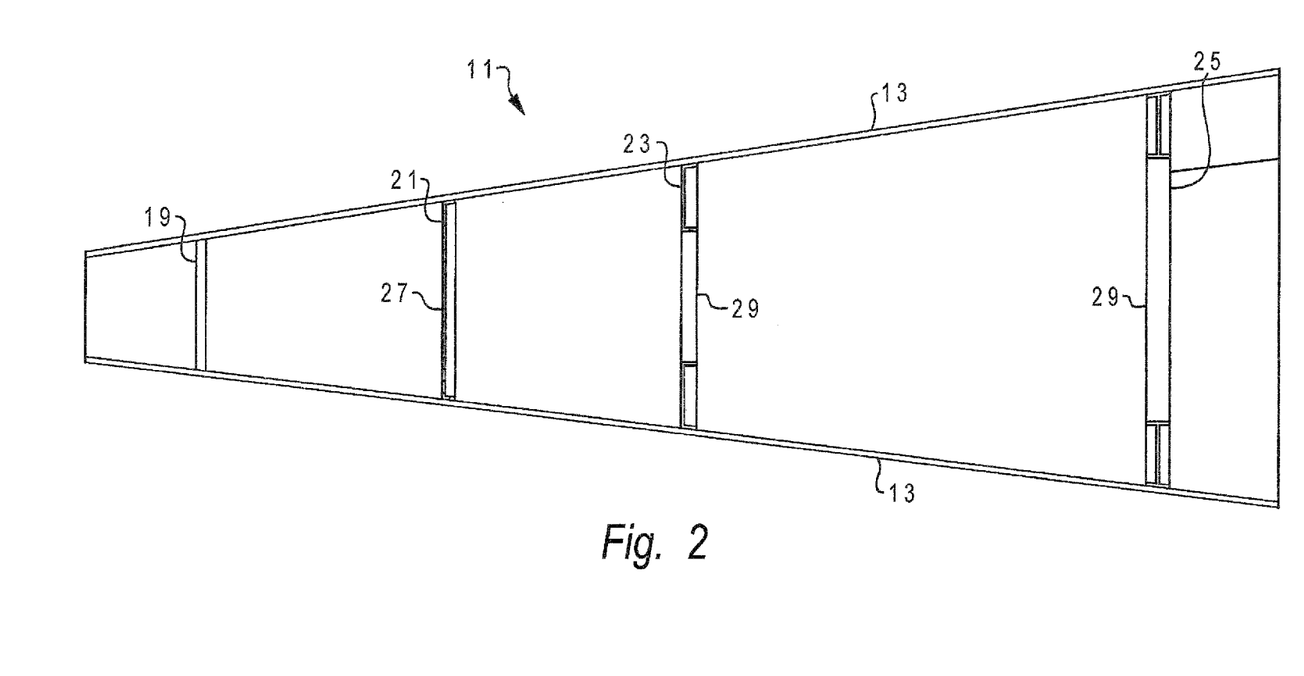
FIG. 2 is a longitudinal cross-sectional view of the tail boom of FIG. 1 showing several types of stiffening members according to the present invention installed therein.

Referring to FIGS. 1 and 2 in the drawings, the preferred embodiment of a contact stiffener for structural skin according to the present invention is illustrated. This preferred embodiment will be described with reference to a conical tail boom 11 for an aircraft. Tail boom 11 includes a skin 13 that is supported longitudinally by a plurality of elongated spaced apart longerons 15 and circumferentially by a plurality of slip-in ribs 17. Skin 13 is made with using a number of methods, including filament winding, braiding, fiber placement, or hand lay-up with either prepreg, thermoset or thermoplastic, or resin infusion methods, such as resin transfer molding, or variations, such as pultrusion, extrusion, or roll forming from metallic or composite sheets or panels of fiber composite laminates. Longerons 15 are co-cured or integral with skin 13. Slip-in ribs 17 include castellations 18 to fit around longerons 15. It will be appreciated that in some applications it may be desirable that a clearance exist between the top and sides of castellations 18 and longerons 15, as the primary load transfer is in compression between the interior surface of skin 13 and the peripheral edges of slip-in rib 17 that are in contact therewith.

Slip-in ribs 17 are simply inserted through the large end opening of conical tail boom 11 and pressed into place. The peripheral edges of slip-in ribs 17 are press fit into contact with the interior surface of skin 13. Thus, there is no need for any filler between the peripheral edges of slip-in ribs 17 and the interior surface of skin 13 to account for tolerances. In most applications, slip-in ribs 17 are held in place by retention means, such as snap-in clips, springs, or detent devices.

Slip-in ribs 17 may have a wide variety of shapes and configurations. Four possible configurations are shown in FIG. 2. Slip-in rib 19 is a solid plug, slip-in rib 21 has a C-channel configuration with a solid web portion 27. Slip-in rib 23 has an open C-channel configuration with a central aperture or truss structure 29, and slip-in rib 25 has an open I-beam configuration having a central aperture or truss structure 31. It will be appreciated that these and other configurations may be used depending various factors, such as the location of the rib, the need to pass other components through the rib, and the load requirements. In an alternate version of this embodiment, tail boom 11 is formed by a flat skin with longitudinal stiffeners wrapped into a conical shape to form a tailboom structure.

Figure 3:
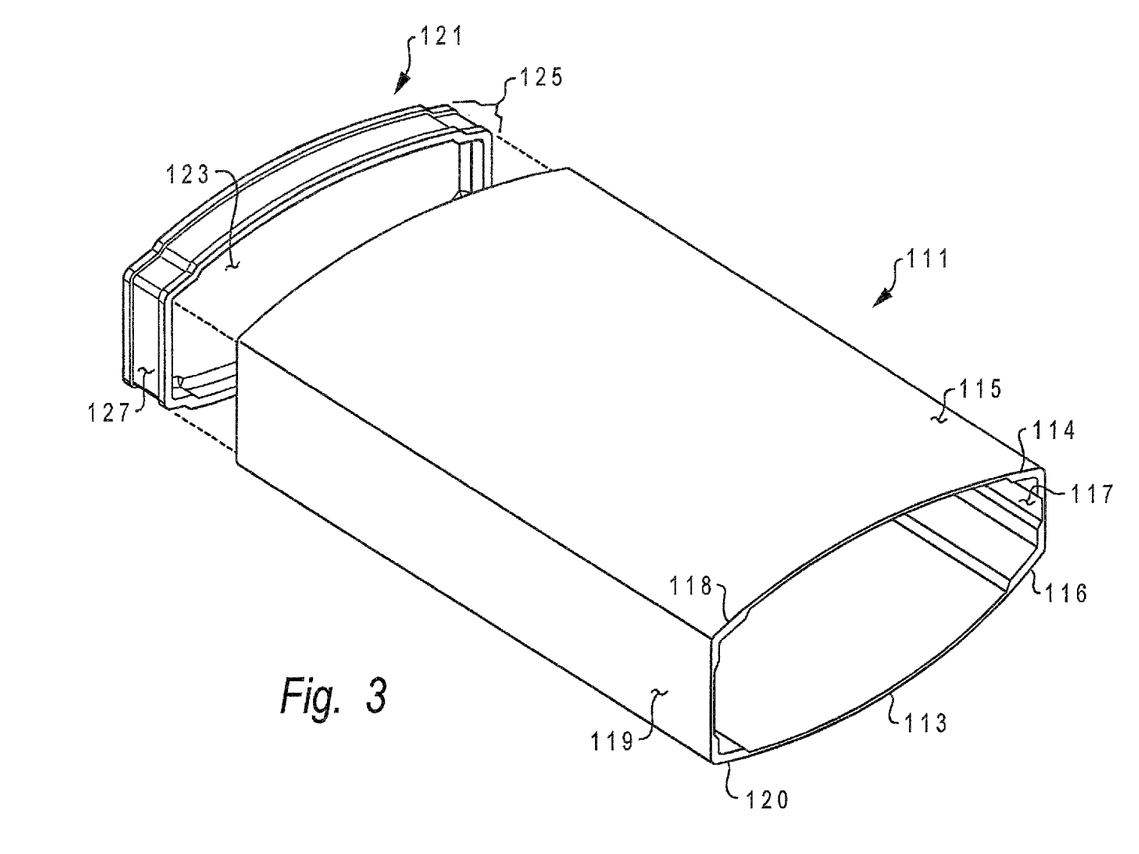
FIG. 3 is an exploded perspective view of a box beam structure having a slip-in rib according to the present invention.
Figure 4:
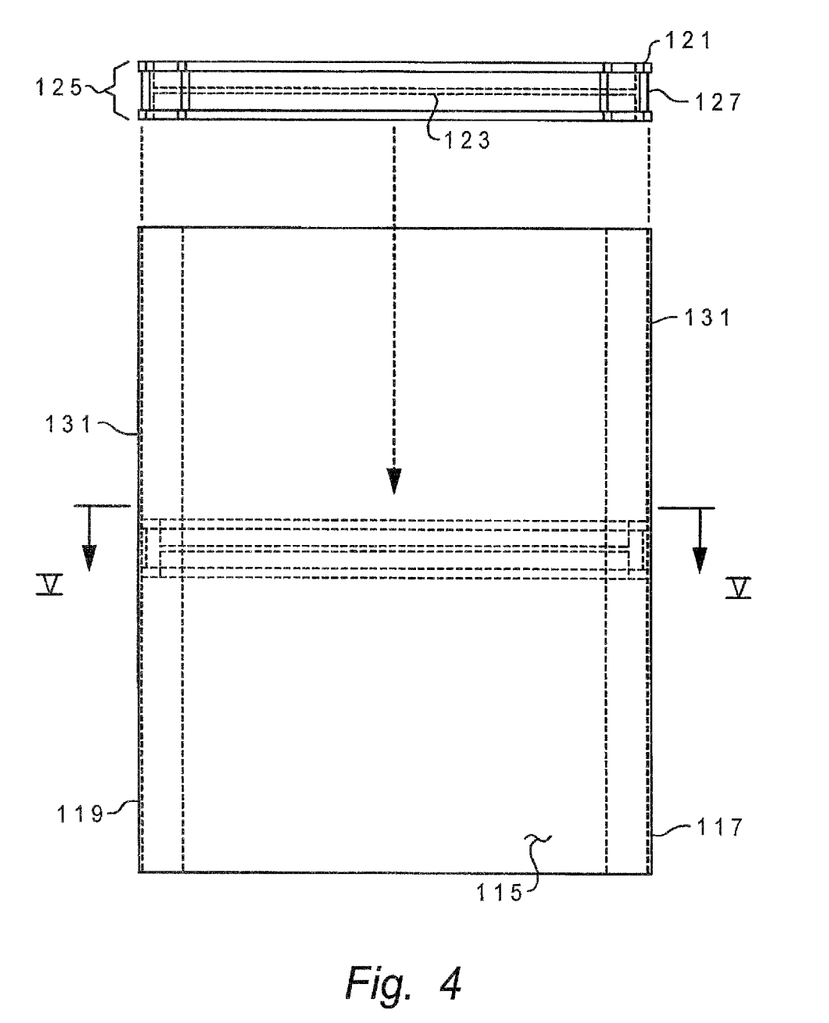
FIG. 4 is an exploded top view of the box beam structure having a slip-in rib of FIG. 3 showing the installation location of the slip-in rib.

Referring now to FIGS. 3 and 4 in the drawings, a structural box beam 111 according to the present invention is illustrated. Box beam 111 is a one-piece, thin-walled hollow structure having walls 113, 115, 117, and 119. Walls 113 and 115 form upper and lower surfaces of box beam 111, and walls 117 and 119 form side walls of box beam 111. As is shown, walls 113, 115, 117, and 119 may include additional material at corners 114, 116, 118, and 120 to provide longitudinal stiffness to box beam 111, if desired.

Box beam 111 is internally supported by at least one slip-in rib 121. Slip-in rib 121 has an internal web portion 123 and a peripheral flange portion 125. Although web portion 123 has been shown as a solid plate member, it should be understood that web portion 123 may include apertures and/or a truss arrangement (not shown) that would allow cables, wiring, and other component parts to pass longitudinally through box beam 111. Flange portion 125 includes a recessed channel 127 that extends along the periphery of slip-in rib 121. Web portion 123 and flange portion 125 cooperate to allow slip-in rib 121 to function as an I-beam. This configuration allows slip-in rib 121 to be very strong in compression, which the primary functional load transfer path of the present invention.

Walls 113, 115, 117, and 119 are typically integrally formed by filament winding, braiding, fiber placement or hand lay-up with either prepreg or resin infusion methods such as resin transfer molding, or variations such as, pultrusion, or extrusion, or roll forming from metallic sheets or panels of fiber composite laminates, and slip-in ribs 121 are preferably fabricated from either a metallic or non-metallic fiber filled machining-tolerant plate material. Compression or injection molding or reaction injection molding may also be used to produce net molded ribs. However, it will be appreciated that walls 113, 115, 117, and 119 and slip-in ribs 121 may be formed from other suitable materials, depending upon load, assembly, and application requirements.

In conventional box beam structures, walls 113, 115, 117, and 119 cannot be integrated or pre-assembled without attaching the internal ribs and other support structures. One major benefit of the present invention is that walls 113, 115, 117, and 119 can be integrally produced or assembled prior to installation of the internal support network. This is because slip-in ribs 121 are configured to facilitate installation into an integral or one piece box beam 111.

The location of slip-in rib 121 after installation into box beam 111 is shown in dashed lines in FIG. 4. As is shown, a small clearance, or gap 131, exists between the exterior edges of flange 125 and the interior surfaces of walls 113, 115, 117, and 119. This gap allows slip-in ribs 121 to be quickly and easily inserted into the interior of box beam 111. As will be explained in more detail below, gap 131 allows slip-in ribs 121 to accommodate certain manufacturing tolerances, as well. Although only one slip-in rib 121 is shown, it will be appreciated that as many slip-in ribs 121 as are necessary to provide the desired support for box beam 111 may be installed into box beam 111. Slip-in ribs 121 may be installed from either end of box beam 111.

Figure 5:
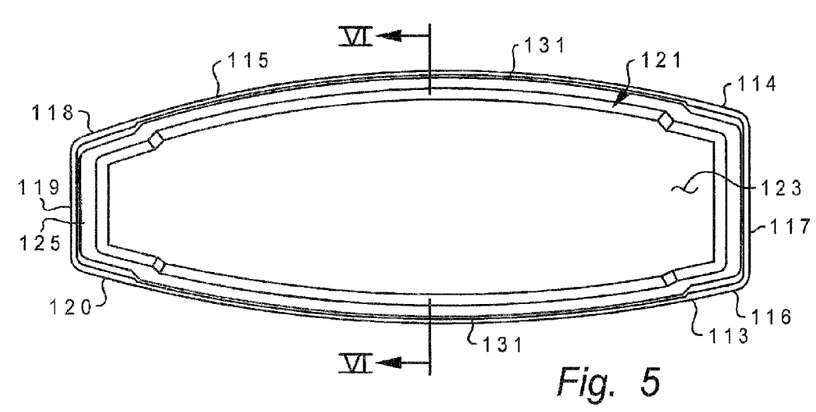
FIG. 5 is a cross-sectional view of the box beam structure having a slip-in rib of FIG. 4 taken at V-V.

Referring now to FIG. 5 in the drawings, box beam 111 with slip-in rib 121 installed is shown in a cross-sectional view taken at V-V of FIG. 4. As is shown, it is preferred that the peripheral shape and contour of slip-in rib 121 closely match the internal shape and contour of box beam 111. This ensures that gap 131 between the exterior edges of flange 125 and the interior surfaces of walls 113, 115, 117, and 119 is generally uniform, even though manufacturing tolerances may dictate that there be a finite gap of varying size therebetween.

Figure 6:
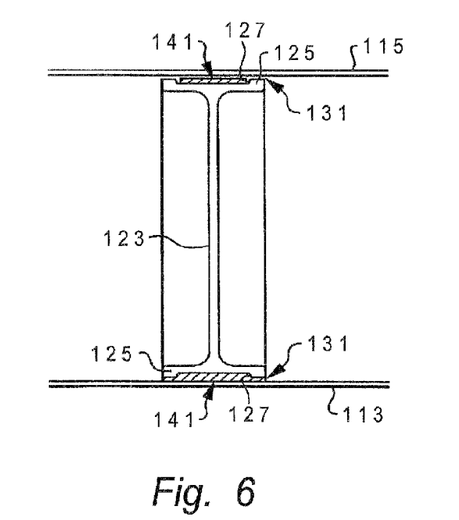
FIG. 6 is a cross-sectional view of the box beam structure having a slip-in rib of FIG. 5 taken at VI-VI.

Referring now to FIG. 6 in the drawings, box beam 111 with slip-in rib 121 installed is shown in a cross-sectional view taken at VI-VI of FIG. 5. As is shown, a filler material 141 is disposed in channel 127. Filler material 141 may partially fill channel 127, fully fill channel 127, or overfill channel 127. In the preferred embodiment, the filler material 141 is an expandable foam-type adhesive that is installed in channel 127 prior to the insertion of slip-in rib 121 into the interior of box beam 111, and then activated so as to make the adhesive expand and fill channel 127 and gap 131. The process for activating expandable adhesive 141 is typically an increased temperature and or increased pressure curing process in which the temperatures and duration of curing depend upon the particular expandable adhesive used and the load and response characteristics desired. This process allows a relatively large clearance to be maintained for ease of insertion and assembly of slip-in ribs 121. Although the entire structure can be heated in a large oven to activate the expandable adhesive, local means of heat can also be used including by placing resistive heating elements or strips in proximity of the adhesive or inside or adjacent to the adhesive and passing a current through the resistive material through contacts. Resistive heating elements can be embedded into the skin lay-up adjacent to the rib and a network of contacts or wires can be routed to a point of external access. Induction heating can be employed by using magnetic material in proximity or in the adhesive and introducing a magnetic field. Induction heating can also be used with a magnetic layer embedded into the skin lay-up in proximity of the adhesive.

In FIG. 6, the upper portion of channel 127 shows expandable filler material 141 prior to activation, and the lower portion of channel 127 shows expandable filler material after activation and expansion. As is shown, after expandable filler material 141 expands, channel 127 and gap 131 are filled with expandable filler material 141.

Figure 7A:
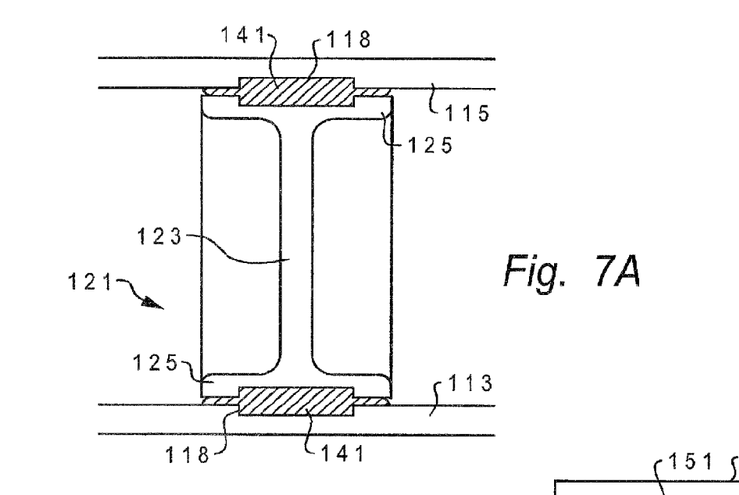
FIGS. 7A and 7B are alternate embodiments of the box beam structure having a slip-in rib according to the present invention.
Figure 7B:
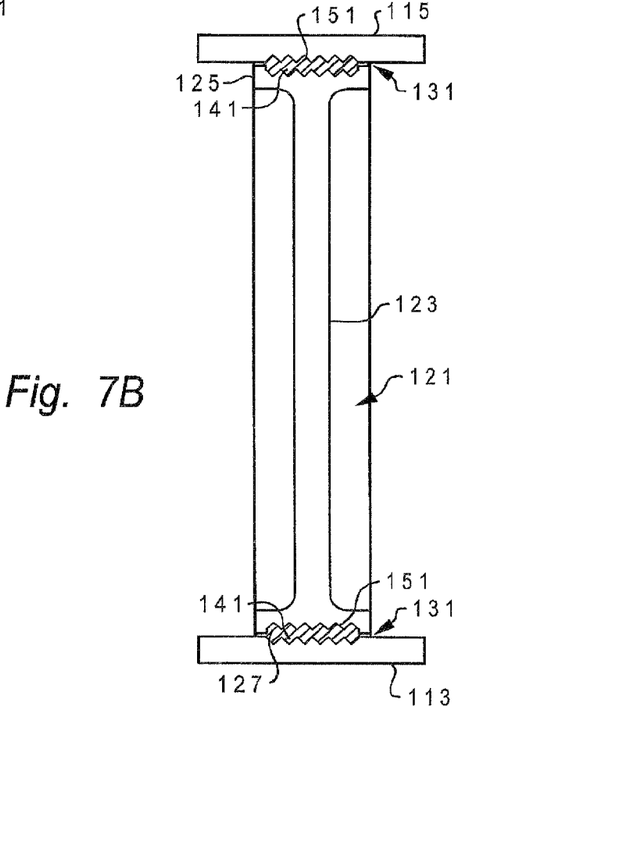

Referring now to FIGS. 7A and 7B in the drawings, two alternate embodiments of the present invention are illustrated. In these embodiments, the interface between flange 125 and the internal surface of walls 113, 115, 117, and 119 is modified to improve strength for loads perpendicular to the plane of slip-in rib 121. In these embodiments, filler material 141 is an expandable filler material that may not bond with slip-in rib 121 or walls 113, 115, 117, and 119, but still provides an acceptable mechanical lock to react lateral pressure loads on slip-in rib 121.

In the embodiment of FIG. 7A, a recessed groove or slot 118 is added to the interior surface of walls 113, 115, 117, and 119 opposite flange 125. Channel 127 and slot 118 are filled with filler material 141. After curing, filler material 141 forms a mechanical lock which provides longitudinal stability and helps prevent slip-in rib 121 from moving longitudinally relative to walls 113, 115, 117, and 119. In the embodiment of FIG. 7B, circumferential grooves 151 are added at the bond interface to trap filler material 141 as filler material 141 expands. After curing filler material 141, grooves 151 provide longitudinal stability and help prevent slip-in rib 121 from moving longitudinally relative to walls 113, 115, 117, and 119 by means of mechanical lock.

In the embodiment of FIGS. 7A and 7B, the attachment between slip-in rib 121 and the interior of walls 113, 115, 117, and 119 is not critically loaded. Slip-in rib 121 can provide buckling support and shape retention through compressive load transfer only. Thus, the structural bond formed by filler material 141 is only secondary.

The foregoing discussion and the embodiments of FIGS. 1-7B are particularly well suited for secondary structural ribs, i.e., ribs that only react compressive loads. However, primary structural ribs require a structural adhesive bond or mechanical fastening between the rib and the box beam skins. Therefore, it is necessary to provide a means for structurally securing the rib within the box beam. This can be accomplished using either a structural adhesive or mechanical retainers.

Figures 8, 9, 10:
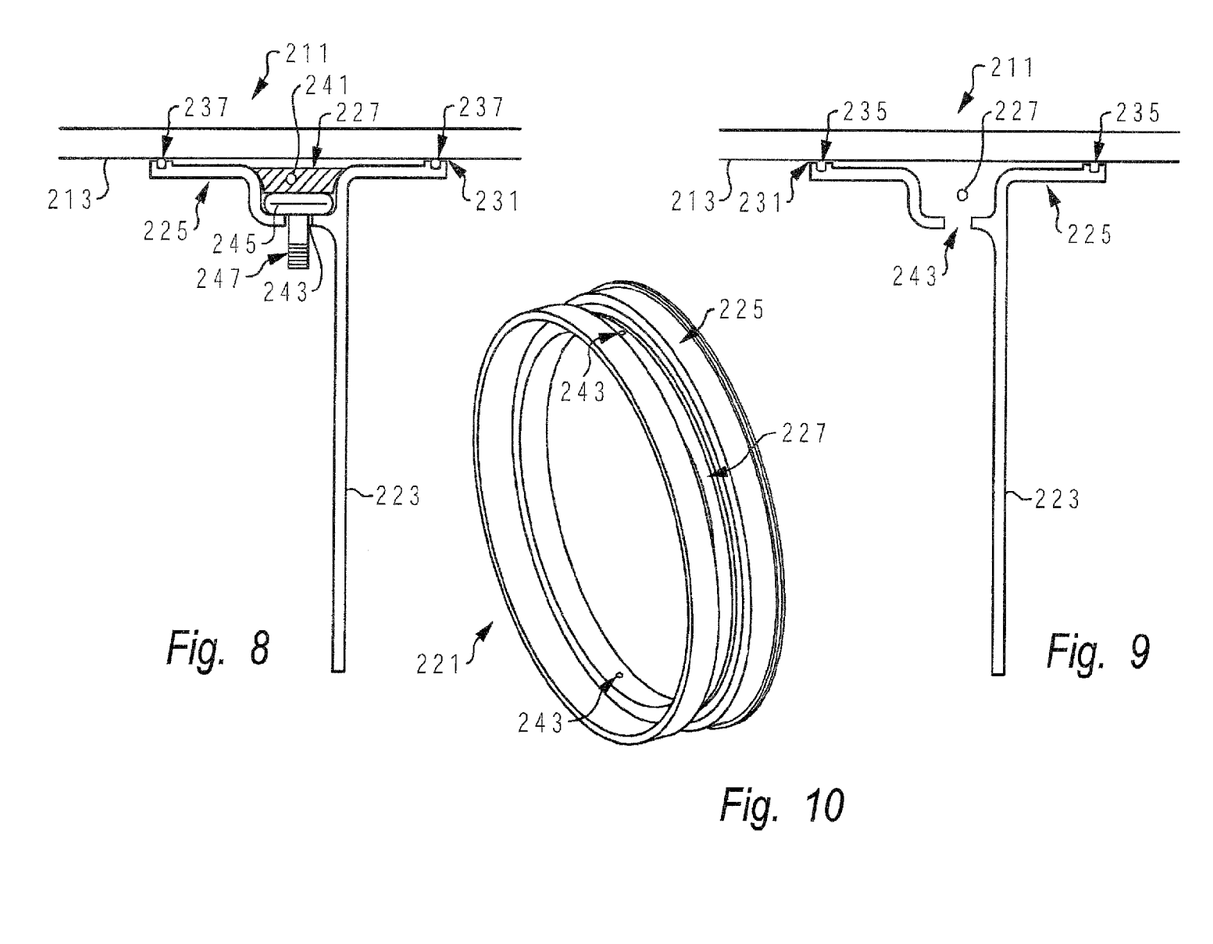
FIG. 8 is another alternate embodiment of the box beam structure having a slip-in rib according to the present invention.
FIG. 9 is another alternate embodiment of the box beam structure having a slip-in rib according to the present invention.
FIG. 10 is a perspective view of the slip-in ribs of FIGS. 8 and 9.

Referring now to FIGS. 8-10 in the drawings, two embodiments of slip-in ribs according to the present invention that are suitable for use as both secondary and primary structural ribs are illustrated. For primary structural ribs, the rib must be bonded using a structural adhesive and/or mechanically fastened to the skin of the structural box beam in the local area of load introduction. Other regions of the primary rib can still rely on compression only contact. Although mechanical fasteners may be used, in the preferred embodiment of the present invention, structural adhesives are used to form the bond between the slip-in rib and the skin of the box beam and fasteners are installed after this adhesive material cures as necessary.

As is shown, a structural box beam 211 includes a skin 213 and a slip-in rib 221. Slip-in rib 221 includes an internal web portion 223 and a peripheral flange portion 225. As with slip-in rib 121, although web portion 223 has been shown as a solid plate member, it should be understood that web portion 223 may include void spaces and/or a truss arrangement (not shown) that would allow cables, wiring, and other component parts to pass longitudinally through box beam 211.

Flange portion 225 includes a recessed channel 227 that extends along the periphery of slip-in rib 221 to receive a structural adhesive material 241. As is shown, a small clearance, or gap 231, exists between the exterior edges of flange 225 and the interior surfaces of skin 213. In these embodiments, small peripheral grooves 235 may be included in both sides of flange 225 for receiving optional seal members, such as an O-rings 237. O-rings 237 help to initially seat slip-in rib 221 and help to contain adhesive 241 if required.

In these embodiments, it is necessary to form a structural bond between slip-in rib 221 and the interior surface of skin 213. Although mechanical fasteners may be used, it is preferred that structural adhesive be used to form the structural bond. One method of forming this bond is to use a self-contained displacement mechanism to force structural adhesive 241 outward into contact with the interior surface of skin 213. This method is illustrated in FIG. 8. Another method of forming this bond is to inject structural adhesive 241 through apertures 243 in recessed channel 227. This method is illustrated in FIG. 9. It will be appreciated that there may be many other ways to form this bond that fall within the scope of the present invention. FIG. 10 is a perspective view of slip-in rib 221.

In the method of FIG. 8, channel 227 is lined with a self-contained displacement mechanism, such as an evacuated or collapsed inflatable tubular bladder 245. Structural adhesive 241 is then located on top of the displacement mechanism, inflatable bladder 245 in this example. Channel 227 is sized and shaped to accommodate the reduced volume of bladder 245 and additional volume to accommodate enough structural adhesive 241 to fill the interface area between slip-in rib 221 and skin 213. Bladder 245 is preferably made of a material, such as nylon, rubber, or other elastomeric material, such that when inflated or otherwise activated, structural adhesive 241 is displaced outward into contact with the interior surface of skin 213, thereby forming the structural bond between slip-in rib 221 and skin 213. Bladder 245 may then be sealed so as to remain inflated, become a sacrificial "fly-away" tool, or be extracted from channel 227 after structural adhesive 241 cures. In this embodiment, apertures 243 may be used to allow access to one or more valve stems 247 for inflating bladder 245. The use of a self-contained displacement mechanism, such as bladder 245, allows a measured or metered volume of a fluid adhesive to be dispensed. This eliminates the requirement to control adhesive volume using conventional methods, such as calendared or film adhesive.

In the method of FIG. 9, slip-in rib 221 is inserted dry into place within skin 213. Then, structural adhesive 241 is injected through apertures 243, so as to flow around and fill channel 227. Channel 227 is sized and shaped to allow adhesive 241 to flow around the perimeter of slip-in rib 221 without squeezing out of flange 227. As is shown in FIG. 10, apertures 243, which may be located at varying locations around flange 225, and which may be simple inspection ports, may be used to ensure that adhesive 241 has adequately filled channel 227. Structural adhesive 241 is forced into channel 227 with sufficient pressure to force structural adhesive into contact with the interior surface of skin 213, thereby forming the structural bond between slip-in rib 221 and skin 213.

It should be understood that although the embodiments of FIG. 8-10 have been shown and described with continuous adhesion, it is not necessary that structural adhesive 241 form a continuous bond with skin 213. According to the present invention, only local adhesion is required. For example, portions of the interface between slip-in rib 221 and skin 213 may be treated so as to release structural adhesive 241 at selected locations and maintain the bond at other locations.

As forth above, mechanical retainers may be used instead of structural adhesive to secure the slip-in ribs in place within the box beam. Some mechanical retainers include: shims with snap-in receivers, spring biased buttons, and leaf springs, to name a few.

The slip-in ribs of the present invention reduce the complexity of the assembly of box beam structures, particularly in applications where the number of parts has been reduced. This is because the slip-in ribs of the present invention are not directly dependent upon the number of joints where manufacturing tolerances are accommodated. Also, the installation of fasteners into box beam structure presents difficulties such as access to small interior spaces and sealing requirements. The process by which the slip-in ribs of the present invention are installed accommodates tolerance buildup, resulting in reduced part count. This reduces manufacturing labor because fastener installation is eliminated.

By using the slip-in ribs according to the present invention, the costs associated with manufacturing a closed-box structure can be reduced due to relaxed tolerances and the ability to reduce part count without incurring additional assembly cost. Because the rib/box bond is secondary, failure of the rib/box bond is not a significant structural concern as long as the rib position in the box is retained.

Using slip-in ribs that can be bonded in place with a process that accommodates tolerance build-up results in reduced part count, as installing one-piece ribs in one-piece structural box beams is possible; and manufacturing labor is reduced, as fastener installation is eliminated.

Although the present invention has been described with respect to a slip-in rib having basically the same shape and contour as the geometrical cross-section of the structural box beam, it should be understood that the concept of the present invention, i.e., the ability to internally support the box beam using compression-only load paths, may be achieved by other means, as well, including the use of rigid, elongated rods placed between ribs or spars, the rods not being fixed to the internal surface of the box beam. These rods resist buckling of the skins by maintaining the desired spacing between internal stiffening members.

It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A method of supporting a structural box beam, the structural box beam comprising a plurality of walls, the plurality of walls comprising an upper wall and a lower wall, the plurality of walls also comprising opposing side walls extending between and connecting the upper and lower walls, the plurality of walls extending along a central axis of the structural box beam from an opening in the structural box beam, the plurality of walls forming an enclosure in a plane orthogonal to the central axis, the method comprising:
   providing an internal support member, the internal support member having a central web portion, a peripheral flange, and a recessed channel in the peripheral flange;
   inserting the internal support member into the interior of the structural box beam, the structural box beam being assembled prior to insertion of the internal support member, the internal support member being sized to maintain a gap between the internal support member and the structural box beam, the inserting including moving the internal support member along the central axis of the structural box beam from the opening in the structural box beam towards said plane until the central web portion is coplanar with said plane; and
   forming a bond between the internal support member and an interior surface of at least one of the plurality of walls of the structural box beam, the gap between the internal support member and the interior surface of the structural box beam is maintained after bonding.

2. The method according to claim 1, further comprising:
   prior to the inserting of the internal support ember into the interior of the structural box beam, disposing an expandable filler material in at least a portion of the recessed channel;
   wherein the forming of the bond between the internal support member and the interior surface of the structural box beam comprises activating the expandable filler material such that the filler material expands, thereby filling gaps between the peripheral flange and the interior surface of the structural box beam.

3. The method according to claim 1, wherein the step of forming a bond between the internal support member and an interior surface of the structural box beam comprises the steps of:
   disposing an inflatable bladder in the recessed channel;
   disposing an adhesive in the recessed channel; and
   forcing the adhesive into an interface area by inflating the inflatable bladder, the interface area being a small gap formed between the peripheral flange and the interior surface of the structural box beam.

4. The method according to claim 3, wherein a valve stem extends through an aperture in the channel.

5. The method according to claim 3, wherein the step of forming a bond between the internal support member and an interior surface of the structural box beam further comprises the steps of:
   curing the adhesive; and
   deflating the inflatable bladder.

6. The method according to claim 3, wherein the step of forming a bond between the internal support member and an interior surface of the structural box beam further comprises the steps of:
   curing the adhesive; and
   retaining the inflatable bladder within the channel.

7. The method according to claim 1, wherein the step of forming a bond between the internal support member and an interior surface of the structural box beam comprises the step of:
   injecting an adhesive through an aperture in the recessed channel.

8. The method according to claim 1, wherein the internal support member further comprises a seal member in the peripheral flange, the seal member being configured to retain adhesive between the peripheral flange and the interior surface of the structural box beam.

9. The method according to claim 2, wherein the recessed channel extends about the entire periphery of the central web portion, and wherein the disposing of the expandable filler material includes fully filling the recessed channel with the expandable filler material.

10. The method according to claim 2, wherein the activating of the expandable filler material comprises increasing the temperature of the expandable filler material.

11. The method according to claim 2, wherein the activating of the expandable filler material comprises increasing the pressure of the expandable filler material.

12. The method according to claim 2, wherein the expandable filler material comprises an expandable adhesive.

* * * * *